US012500721B2

(12) United States Patent
Zhu et al.

(10) Patent No.: US 12,500,721 B2
(45) Date of Patent: Dec. 16, 2025

(54) CONFIGURING SOUNDING REFERENCE SIGNAL RESOURCE SETS

(71) Applicant: LENOVO (BEIJING) LIMITED, Beijing (CN)

(72) Inventors: Chenxi Zhu, Fairfax, VA (US); Bingchao Liu, Beijing (CN); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 386 days.

(21) Appl. No.: 18/019,134

(22) PCT Filed: Aug. 7, 2020

(86) PCT No.: PCT/CN2020/107733
§ 371 (c)(1),
(2) Date: Feb. 1, 2023

(87) PCT Pub. No.: WO2022/027562
PCT Pub. Date: Feb. 10, 2022

(65) Prior Publication Data
US 2023/0283430 A1     Sep. 7, 2023

(51) Int. Cl.
*H04L 5/00*     (2006.01)
*H04W 16/28*     (2009.01)
(Continued)

(52) U.S. Cl.
CPC .......... *H04L 5/0051* (2013.01); *H04W 16/28* (2013.01); *H04W 72/1268* (2013.01); *H04W 72/23* (2023.01)

(58) Field of Classification Search
CPC ... H04B 7/0404; H04B 7/0691; H04L 5/0051; H04W 16/28; H04W 72/1268; H04W 72/23
See application file for complete search history.

(56) References Cited

U.S. PATENT DOCUMENTS

| 10,660,077 B2 * | 5/2020 | MolavianJazi | ..... H04W 52/346 |
| 11,129,148 B2 * | 9/2021 | MolavianJazi | ..... H04W 52/346 |

(Continued)

FOREIGN PATENT DOCUMENTS

| CN | 112534888 A | * | 3/2021 | ............ H04W 72/56 |
| CN | 112534889 A | * | 3/2021 | ............ H04W 72/56 |

(Continued)

OTHER PUBLICATIONS

International Searching Authority, "Written Opinion of the International Searching Authority," PCT/CN2020/107733, Apr. 26, 2021, pp. 1-3.

(Continued)

*Primary Examiner* — Eric Nowlin
(74) *Attorney, Agent, or Firm* — Kunzler Bean & Adamson

(57) ABSTRACT

Apparatuses, methods, and systems are disclosed for configuring sounding reference signal resource sets. One method (500) includes receiving (502), at a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

12 Claims, 10 Drawing Sheets

(51) Int. Cl.
*H04W 72/1268* (2023.01)
*H04W 72/23* (2023.01)

(56) References Cited

U.S. PATENT DOCUMENTS

| | | | |
|---|---|---|---|
| 11,184,129 B2* | 11/2021 | Sridharan | H04L 5/0048 |
| 11,368,941 B2* | 6/2022 | MolavianJazi | H04W 52/281 |
| 11,398,930 B2* | 7/2022 | Kwak | H04W 80/02 |
| 11,424,793 B2* | 8/2022 | Liu | H04B 7/0456 |
| 11,438,112 B2* | 9/2022 | Jiang | H04L 5/0051 |
| 11,516,684 B2* | 11/2022 | Jiang | H04B 7/0695 |
| 11,871,220 B2* | 1/2024 | Grossmann | H04L 5/0044 |
| 12,021,773 B2* | 6/2024 | Davydov | H04B 7/06966 |
| 12,114,335 B2* | 10/2024 | Grossmann | H04L 5/0053 |
| 12,199,907 B2* | 1/2025 | Go | H04L 5/0094 |
| 2013/0195063 A1 | 8/2013 | Ahn et al. | |
| 2019/0098657 A1 | 3/2019 | Golitschek Edler von Elbwart et al. | |
| 2019/0174466 A1* | 6/2019 | Zhang | H04L 5/0057 |
| 2020/0053657 A1* | 2/2020 | MolavianJazi | H04W 52/367 |
| 2020/0053710 A1* | 2/2020 | MolavianJazi | H04W 72/21 |
| 2020/0053724 A1* | 2/2020 | MolavianJazi | H04L 5/0048 |
| 2020/0099490 A1* | 3/2020 | Sridharan | H04L 5/0007 |
| 2020/0106645 A1 | 4/2020 | Tsai et al. | |
| 2020/0162133 A1* | 5/2020 | Harrison | H04W 52/08 |
| 2020/0351129 A1* | 11/2020 | Kwak | H04W 72/53 |
| 2021/0044400 A1* | 2/2021 | Jiang | H04L 5/0048 |
| 2021/0211908 A1* | 7/2021 | Jiang | H04L 5/0051 |
| 2021/0344386 A1* | 11/2021 | Grant | H04W 72/21 |
| 2021/0399855 A1* | 12/2021 | Davydov | H04B 7/06966 |
| 2022/0021420 A1* | 1/2022 | Liu | H04B 7/0413 |
| 2022/0116979 A1* | 4/2022 | Park | H04B 7/0628 |
| 2022/0200752 A1* | 6/2022 | Matsumura | H04L 5/0048 |
| 2022/0239440 A1* | 7/2022 | Go | H04L 5/0044 |
| 2022/0279467 A1* | 9/2022 | Sun | H04L 5/0051 |
| 2022/0337373 A1* | 10/2022 | Wu | H04L 5/0091 |
| 2022/0361222 A1* | 11/2022 | Chen | H04L 5/0053 |
| 2022/0369321 A1* | 11/2022 | Guan | H04B 7/0617 |
| 2023/0081552 A1* | 3/2023 | Chou | H04B 7/0404 370/329 |
| 2023/0208588 A1* | 6/2023 | Hao | H04B 7/0456 370/329 |
| 2023/0209567 A1* | 6/2023 | Grossmann | H04W 72/232 370/329 |
| 2023/0217459 A1* | 7/2023 | Khoshnevisan | H04W 72/23 370/329 |
| 2023/0247617 A1* | 8/2023 | Matsumura | H04L 5/0051 370/329 |
| 2024/0032063 A1* | 1/2024 | Grossmann | H04L 5/0044 |
| 2025/0024465 A1* | 1/2025 | Grossmann | H04L 5/0051 |

FOREIGN PATENT DOCUMENTS

| | | | | |
|---|---|---|---|---|
| CN | 112534892 A | * | 3/2021 | H04W 72/56 |
| CN | 115362653 A | * | 11/2022 | H04L 5/0044 |
| CN | 116210311 A | * | 6/2023 | H04W 72/23 |
| CN | 112534888 B | * | 10/2023 | H04W 52/146 |
| CN | 112534889 B | * | 4/2024 | H04W 52/146 |
| CN | 115362653 B | * | 5/2024 | H04L 5/0044 |
| CN | 112534892 B | * | 8/2024 | H04W 72/56 |
| EP | 3879738 A1 | * | 9/2021 | H04W 72/232 |
| EP | 3834505 B1 | * | 1/2024 | H04W 52/146 |
| EP | 4118779 B1 | * | 7/2024 | H04W 72/12 |
| EP | 4418600 A2 | * | 8/2024 | H04W 72/12 |
| EP | 3834504 B1 | * | 1/2025 | H04W 72/56 |
| ES | 2988380 T3 | * | 11/2024 | H04W 72/12 |
| JP | 2023510639 A | * | 3/2023 | H04L 5/0051 |
| JP | 7520992 B2 | * | 7/2024 | H04W 72/12 |
| JP | 2024133139 A | * | 10/2024 | H04W 72/12 |
| WO | 2019064258 A1 | | 4/2019 | |
| WO | WO-2020030974 A2 | * | 2/2020 | H04W 52/346 |
| WO | WO-2020030978 A1 | * | 2/2020 | H04W 52/367 |
| WO | WO-2020030982 A1 | * | 2/2020 | H04W 52/16 |
| WO | WO-2021180897 A1 | * | 9/2021 | H04W 72/232 |
| WO | WO-2022027544 A1 | * | 2/2022 | H04B 7/0404 |

OTHER PUBLICATIONS

Ericsson, Introduction of eLAA, 3GPP TSG-RAN Meeting #86, R1-168222, Aug. 22-26, 2016, pp. 1-47, Gothenburg, Sweden.

* cited by examiner

CONFIGURING SOUNDING REFERENCE SIGNAL RESOURCE SETS

FIELD

The subject matter disclosed herein relates generally to wireless communications and more particularly relates to configuring sounding reference signal resource sets.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Aperiodic ("AP"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Code Block Group ("CBG"), CBG Flushing Out Information ("CBGFI"), CBG Transmission Information ("CBGTI"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), Cyclic Redundancy Check ("CRC"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink Feedback Information ("DFI"), Downlink ("DL"), Discrete Fourier Transform Spread OFDM ("DFT-s-fOFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiplexing ("FDM"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), High-Speed Train ("HST"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Least-Significant Bit ("LSB"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Maximum Permissible Exposure ("MPE"), Most-Significant Bit ("MSB"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Non-Coherent Joint Transmission ("NCJT"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Remote Radio Head ("RRH"), Reference Signal ("RS"), Reference Signal Received Power ("RSRP"), Reference Signal Received Quality ("RSRQ"), Redundancy Version ("RV"), Receive ("RX"), Single Carrier Frequency Domain Spread Spectrum ("SC-FDSS"), Secondary Cell ("SCell"), Spatial Channel Model ("SCM"), Sub Carrier Spacing ("SCS"), Single DCI ("S-DCI"), Spatial Division Multiplexing ("SDM"), Service Data Unit ("SDU"), Single Frequency Network ("SFN"), Subscriber Identity Module ("SIM"), Signal-to-Interference Ratio ("SINR"), Sidelink ("SL"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indication ("TCI"), Time Division Duplex ("TDD"), Time Division Multiplexing ("TDM"), Temporary Mobile Subscriber Identity ("TMSI"), Transmit Power Control ("TPC"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Ultra Reliable Low Latency Communication ("URLLC"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Virtual Resource Block ("VRB"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, there may be SRS resources configured.

BRIEF SUMMARY

Methods for configuring sounding reference signal resource sets are disclosed. Apparatuses and systems also perform the functions of the methods. In one embodiment, the method includes receiving, at a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

An apparatus for configuring sounding reference signal resource sets, in one embodiment, includes a receiver that receives a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

A method for configuring sounding reference signal resource sets includes transmitting, to a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

An apparatus for configuring sounding reference signal resource sets, in one embodiment, includes a transmitter that transmits, to a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

A method for configuring sounding reference signal resource sets includes receiving, at a user equipment, a radio resource control message configuring a physical uplink control channel resource or a physical uplink control channel resource group comprising a resource group identifier, a panel identifier, or a combination thereof.

An apparatus for configuring sounding reference signal resource sets, in one embodiment, includes a receiver that receives a radio resource control message configuring a physical uplink control channel resource or a physical uplink control channel resource group comprising a resource group identifier, a panel identifier, or a combination thereof.

A method for configuring sounding reference signal resource sets includes transmitting, to a user equipment, a radio resource control message configuring a physical uplink control channel resource or a physical uplink control channel resource group comprising a resource group identifier, a panel identifier, or a combination thereof.

An apparatus for configuring sounding reference signal resource sets, in one embodiment, includes a transmitter that transmits, to a user equipment, a radio resource control message configuring a physical uplink control channel resource or a physical uplink control channel resource group comprising a resource group identifier, a panel identifier, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
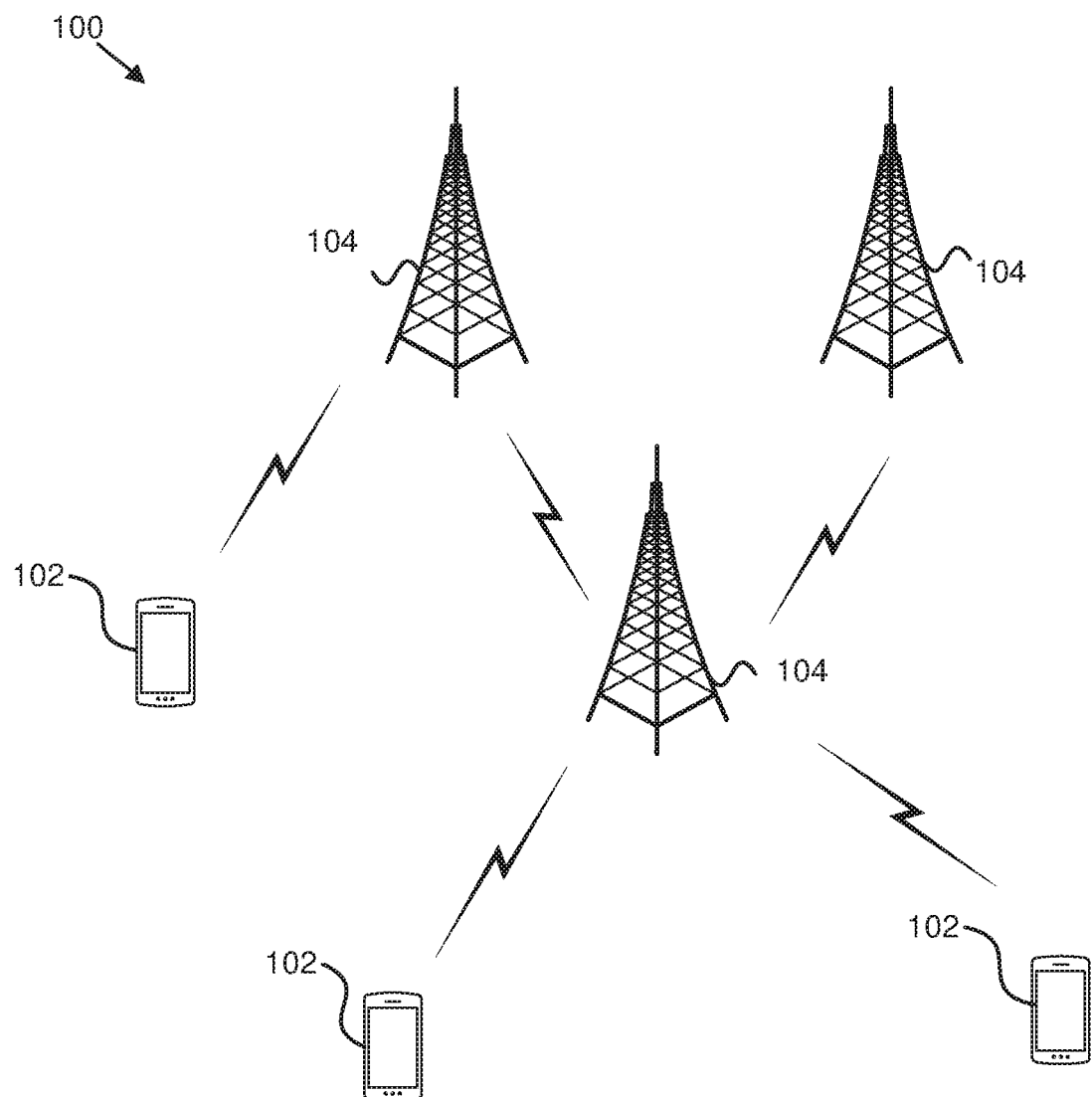
FIG. 1 is a schematic block diagram illustrating one embodiment of a wireless communication system for configuring sounding reference signal resource sets.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring sounding reference signal resource sets. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 (e.g., UE) may receive a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time. Accordingly, a remote unit 102 may be used for configuring sounding reference signal resource sets.

In some embodiments, a network unit 104 may transmit, to a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time. Accordingly, a network unit 104 may be used for configuring sounding reference signal resource sets.

In certain embodiments, a remote unit 102 (e.g., UE) may receive a radio resource control message configuring a physical uplink control channel resource or a physical uplink control channel resource group comprising a resource group identifier, a panel identifier, or a combination thereof. Accordingly, a remote unit 102 may be used for configuring sounding reference signal resource sets.

In various embodiments, a network unit 104 may transmit, to a user equipment, a radio resource control message configuring a physical uplink control channel resource or a physical uplink control channel resource group comprising a resource group identifier, a panel identifier, or a combination thereof. Accordingly, a network unit 104 may be used for configuring sounding reference signal resource sets.

Figure 2:
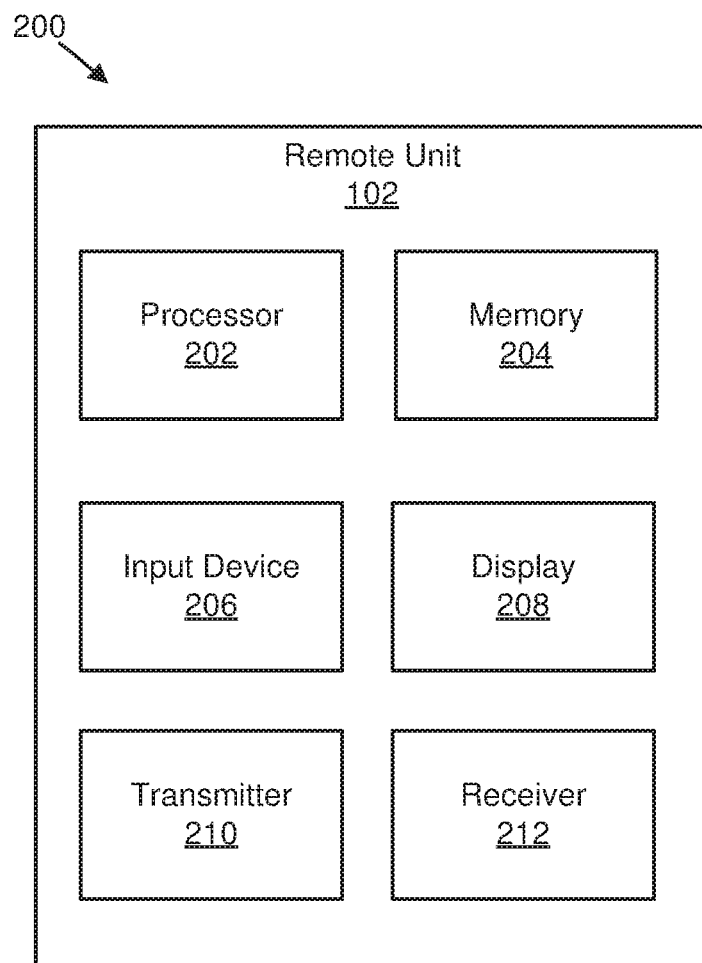
FIG. 2 is a schematic block diagram illustrating one embodiment of an apparatus that may be used for configuring sounding reference signal resource sets.

FIG. 2 depicts one embodiment of an apparatus 200 that may be used for configuring sounding reference signal resource sets. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 may be used for transmitting information described herein and/or the receiver 212 may be used for receiving information described herein and/or the processor 202 may be used for processing information described herein.

In some embodiments, the receiver 212 may receive a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

In certain embodiments, the receiver 212 may receive a radio resource control message configuring a physical uplink control channel resource or a physical uplink control channel resource group comprising a resource group identifier, a panel identifier, or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
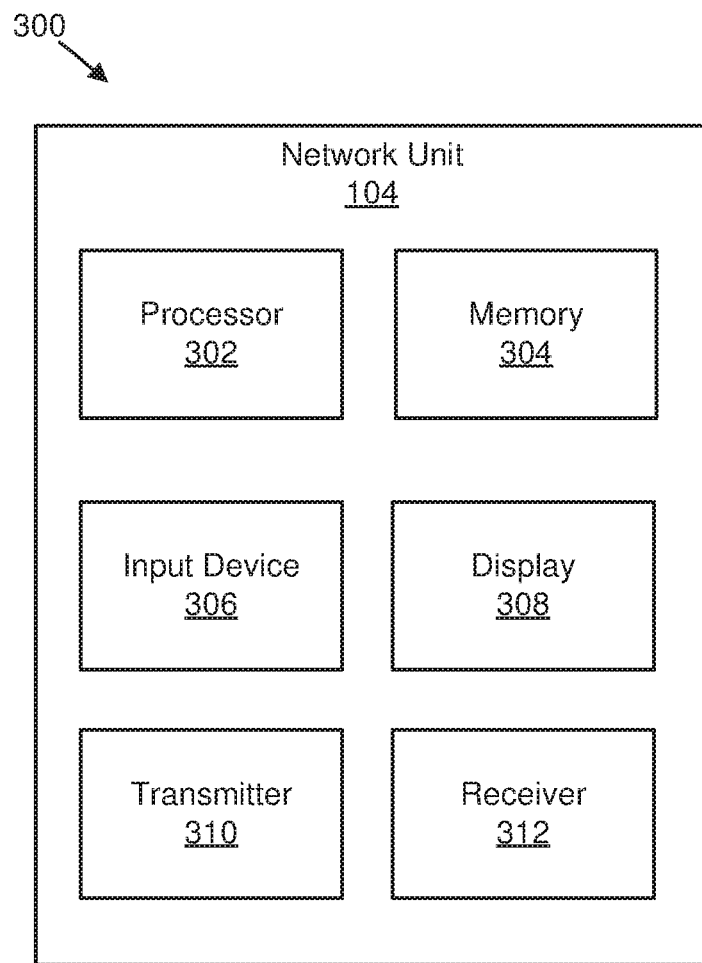
FIG. 3 is a schematic block diagram illustrating one embodiment of an apparatus that may be used for configuring sounding reference signal resource sets.

FIG. 3 depicts one embodiment of an apparatus 300 that may be used for configuring sounding reference signal resource sets. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit, to a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

In some embodiments, the transmitter 310 may transmit, to a user equipment, a radio resource control message configuring a physical uplink control channel resource or a physical uplink control channel resource group comprising a resource group identifier, a panel identifier, or a combination thereof.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, an UL PUSCH transmission may be indicated by DCI (e.g., a DCI format 0_1 or 0_2) which includes an SRI field. This SRI field may indicate SRS resources used for transmission. For codebook-based PUSCH transmissions, the SRI field may indicate a single SRS resource with usage set to "codebook". For non-codebook based PUSCH transmissions, the SRI field may indicate one or more single-port SRS resources with usage set to "nonCodebook". The SRS resources may be configured with a transmission beam in the form of "spatialRelationInfo", which may be configured as a CSI-RS, an SSB and/or an SRS. In various embodiments, a UE uses spatialRelationInfo as a TX beam of a PUSCH transmission.

In some embodiments, if a UE is equipped with multiple antenna panels, in addition to an UL TX beam, a UE may need to know which panel it should transmit a PUSCH transmission if scheduled by a gNB. In certain embodiments, UE panel information may be separate from an UL transmission spatial filter (e.g., UL TX beam) and the UE panel information may not be carried in UL-TCI. In various embodiments, such as if an UL-TCI state is defined using a DL RS (e.g., CSI-RS and/or SSB), a UE may not be able to tell which panel it should transmit with. In some embodiments, an SRI field in DCI (e.g., DCI format 0_1 or 0_2) may be used to indicate a UE panel used for transmission. In certain embodiments, an SRI field in DCI may be used to signal a PUCCH transmission panel.

In various embodiments, a UE (e.g., remote unit 102) may have more than one antenna panel. In such embodiments, all of antenna panels may be used for reception at the same time, but at any given time only one antenna panel may be used for transmission. As may be appreciated, it takes time to switch from one panel to another panel for transmission, and this time may be called a panel switching time. In certain embodiments, a panel may be identified if a UE needs to know which panel it should use for an UL transmission. In some embodiments, an explicit method of UE panel identification may give a panel ID to each panel, and, in various embodiments, an implicit method of UE panel identification may not explicitly indicate a panel, but may use an exclusive transmission property to indicate a panel.

In certain embodiments, such as with an explicit method of UE panel identification, a set of panel IDs may be defined via RRC (e.g., RRC signaling). For example, in RRC a UE may be configured with a set of panel IDs {p1, . . . , pN}. These panel IDs may be used in RRC, MAC-CE, and/or DCI signals to identify the panels directly.

In some embodiments, such as with an implicit method, a set of resource groups with resource group identifiers may be defined in which only resources associated with one group may transmit at any time. For example, a UE may be configured in an RRC message with a set of resource group IDs {g1, g2, . . . , gN} and/or a set of antenna panel IDs. These resource group IDs and/or antenna panel IDs may be used in RRC, MAC-CE, and/or DCI signals to signal to the UE which antenna panels to use.

In various embodiments, an explicit method may be straight forward but may imply that a gNB may direct hardware operation of a UE.

In certain embodiments, such as for an explicit method and/or an implicit method, an association of resource groups and SRS resources may be defined by RRC (e.g., RRC signaling).

In a first embodiment, an antenna panel and/or a resource group may be defined as a set of SRS resource sets.

In the first embodiment, an antenna panel may be defined as shown in Table 1.

TABLE 1

Panel ::= SEQUENCE {
   panelId PanelID,
   srs-ResourceSetIdList SEQUENCE
   (SIZE(1..maxNrofSRS-ResourcesPerSet))
   OF SRS-ResourceSetId
}

In the first embodiment, a resource group may be defined as shown in Table 2.

TABLE 2

Resource-Group ::= SEQUENCE {
   resource-GroupId Resource-GroupID,
   srs-ResourceSetIdList SEQUENCE
   (SIZE(1..maxNrofSRS-ResourcesPerSet))
   OF SRS-ResourceSetId
}

In a second embodiment, antenna panel information and/or resource group information may be defined as an attribute of an SRS resource set.

In the second embodiment, antenna panel information may be defined as shown in Table 3.

TABLE 3

SRS-ResourceSet ::= SEQUENCE {
   srs-ResourceSetId SRS-ResourceSetId,
   srs-ResourceIdList SEQUENCE
   (SIZE(1..maxNrofSRS-ResourcesPerSet)) OF
   SRS-ResourceId OPTIONAL, -- Cond Setup
   resourceType CHOICE {
   aperiodic SEQUENCE {
   aperiodicSRS-ResourceTrigger INTEGER
   (1..maxNrofSRS-TriggerStates-1),
   csi-RS NZP-CSI-RS-ResourceId OPTIONAL, -- Cond NonCodebook
   slotOffset INTEGER (1..32) OPTIONAL, -- Need S
   ...,
   panelId PanelID -OPTIONAL
}

In the second embodiment, resource group information may be defined as shown in Table 4.

TABLE 4

SRS-ResourceSet ::= SEQUENCE {
   srs-ResourceSetId SRS-ResourceSetId,
   srs-ResourceIdList SEQUENCE
   (SIZE(1..maxNrofSRS-ResourcesPerSet)) OF
   SRS-ResourceId OPTIONAL, -- Cond Setup
   resourceType CHOICE {
   aperiodic SEQUENCE {
   aperiodicSRS-ResourceTrigger INTEGER
   (1..maxNrofSRS-TriggerStates-1),
   csi-RS NZP-CSI-RS-ResourceId OPTIONAL, -- Cond NonCodebook
   slotOffset INTEGER (1..32) OPTIONAL, -- Need S
   ...,
   resource-GroupId Resource-GroupID -OPTIONAL
}

In various embodiments, such as for a single panel UE and/or a single resource group UE, a panel ID or a resource group ID may not be necessary. Accordingly, corresponding fields shown in Table 3 and Table 4 may be optional in an RRC definition.

In certain embodiments, a definition of a resource group and/or an antenna panel may also be applied to PUCCH transmissions to indicate a panel from which to transmit the PUCCH transmissions. In some embodiments, a PUCCH transmission resource group may be defined as a set of PUCCH resources sharing the same spatialRelationInfo. In some embodiments, such as for a multi-panel UE, PUCCH transmission may be transmitted from the same panel. The resource group ID and/or antenna panel ID may be configured as an attribute of a definition of PUCCH resource group as shown in Tables 5 and 6.

TABLE 5

```
PUCCH-ResourceGroup-r16 ::= SEQUENCE {
    pucch-ResourceGroupId-r16 PUCCH-ResourceGroupId-r16,
    resourcePerGroupList-r16 SEQUENCE (SIZE (1..maxNrofPUCCH-
    ResourcesPerGroup-r16)) OF PUCCH-ResourceId
    resource-GroupId Resource-GroupID -OPTIONAL
}
PUCCH-ResourceGroupId-r16 ::= INTEGER
(0..maxNrofPUCCH-ResourceGroups-1-r16)
```

TABLE 6

```
PUCCH-ResourceGroup-r16 ::= SEQUENCE {
    pucch-ResourceGroupId-r16 PUCCH-ResourceGroupId-r16,
    resourcePerGroupList-r16 SEQUENCE (SIZE (1..maxNrofPUCCH-
    ResourcesPerGroup-r16)) OF PUCCH-ResourceId
    panelId PanelID -OPTIONAL
}
PUCCH-ResourceGroupId-r16 ::= INTEGER
(0..maxNrofPUCCH-ResourceGroups-1-r16)
```

In various embodiments, PUCCH resource groups sharing the same panel ID and/or resource group ID may be transmitted from the same UE panel.

In certain embodiments, if a PUCCH resource group is not defined, a resource group ID and/or antenna panel ID may be RRC configured directly for a PUCCH resource as shown in Tables 7 and 8.

TABLE 7

| PUCCH-Resource ::= | SEQUENCE { |
|---|---|
| pucch-ResourceId | PUCCH-ResourceId, |
| startingPRB | PRB-Id, |
| intraSlotFrequencyHopping | ENUMERATED { enabled } |
| OPTIONAL, -- Need R | |
| secondHopPRB | PRB-Id |
| OPTIONAL, -- Need R | |
| format | CHOICE { |
| format0 | PUCCH-format0, |
| format1 | PUCCH-format1, |
| format2 | PUCCH-format2, |
| format3 | PUCCH-format3, |
| format4 | PUCCH-format4 |
| } | |
| resource-GroupId Resource-GroupID -OPTIONAL | |
| } | |

TABLE 8

| PUCCH-Resource ::= | SEQUENCE { |
|---|---|
| pucch-ResourceId | PUCCH-ResourceId, |
| startingPRB | PRB-Id, |
| intraSlotFrequencyHopping | ENUMERATED { enabled } |
| OPTIONAL, -- Need R | |
| secondHopPRB | PRB-Id |
| OPTIONAL, -- Need R | |
| format | CHOICE { |

TABLE 8-continued

| format0 | PUCCH-format0, |
|---|---|
| format1 | PUCCH-format1, |
| format2 | PUCCH-format2, |
| format3 | PUCCH-format3, |
| format4 | PUCCH-format4 |
| } | |
| panelId PanelID -OPTIONAL | |
| } | |

In some embodiments, with an antenna panel or resource group defined, such information may be used by a gNB to signal to a UE which antenna panel or resource group to use for PUSCH transmissions. In various embodiments, UL-TCI may be used for a gNB to signal to a UE which UL TX beam the UE should use for codebook-based PUSCH transmissions. Such embodiments may decouple a UL TX beam and a spatial relation of an SRS resource indicated by SRI. In certain embodiments, an SRI field may be used to indicate an SRS resource that a UE may use for a PUSCH transmission. In such embodiments, an antenna panel and/or a resource group may be defined as a set of SRS resource sets. Furthermore, the antenna panel and/or the resource group of the SRS resource set in which the SRS resource is indicated by the SRI field may be used.

Figure 4:
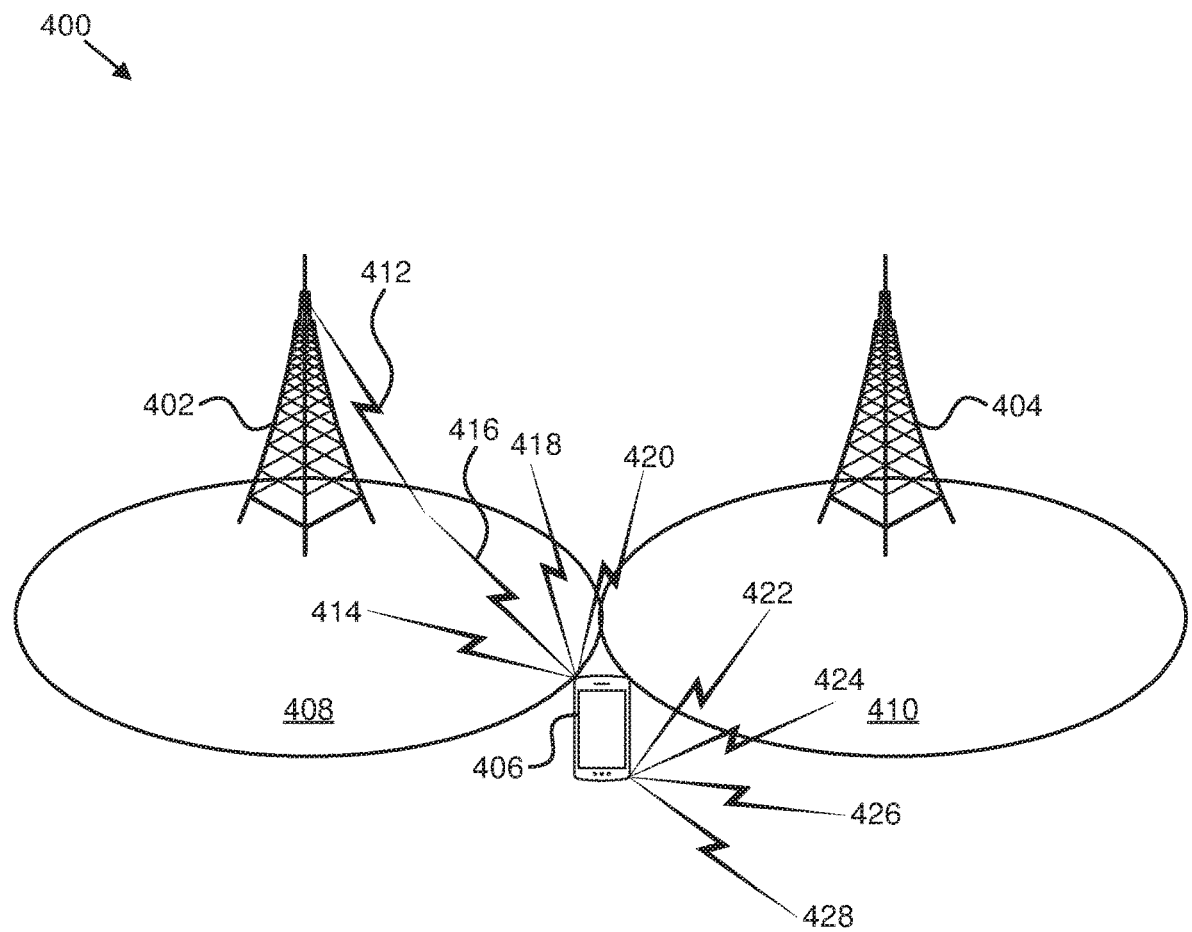
FIG. 4 is a schematic block diagram illustrating one embodiment of a system including UCI-based PUSCH transmissions with an antenna panel indication and/or a resource group indication.

FIG. 4 is a schematic block diagram illustrating one embodiment of a system 400 including UCI-based PUSCH transmissions with an antenna panel indication and/or a resource group indication. The system 400 includes a first TRP 402 (e.g., TRP1), a second TRP 404 (e.g., TRP2), and a UE 406. The first TRP 402 has a first transmission area 408 and the second TRP 404 has a second transmission area 410. As illustrated, the first TRP 402 transmits DCI 412 to the UE 406 to configure information for the UE 406. The UE 406 is equipped with 2 antenna panels and/or resource groups and 8 UL-TCI states. The first antenna panel and/or resource group of the UE 406 may include a first UL-TCI state 414 (e.g., UL-TCI1), a second UL-TCI state 416 (e.g., UL-TCI2), a third UL-TCI state 418 (e.g., UL-TCI3), and a fourth UL-TCI state 420 (e.g., UL-TCI4). Moreover, the second antenna panel and/or resource group of the UE 406 may include a fifth UL-TCI state 422 (e.g., UL-TCI5), a sixth UL-TCI state 424 (e.g., UL-TCI6), a seventh UL-TCI state 426 (e.g., UL-TCI7), and an eighth UL-TCI state 428 (e.g., UL-TCI8). These 8 UL-TCI states may be configured as shown in Table 9.

TABLE 9

| UL-TCI-ID | UL-TCI Reference RS |
|---|---|
| UL-TCI1 | CSI-RS1 |
| UL-TCI2 | CSI-RS2 |
| UL-TCI3 | CSI-RS3 |
| UL-TCI4 | SRS1 |
| UL-TCI5 | CSI-RS4 |
| UL-TCI6 | CSI-RS5 |
| UL-TCI7 | CSI-RS6 |
| UL-TCI8 | SRS2 |

In some embodiments, the UE 406 is configured for codebook-based PUSCH transmission in RRC PUSCH-Config. In various embodiments, the UE 406 is configured with SRS resources SRS1 and SRS2, and the SRS resources SRS1 and SRS2 are configured for antenna panels or resource groups 1 and 2 respectively.

In certain embodiments, if the UE 406 receives the DCI 412 (e.g., a DCI format 0_1) from the first TRP 402 scheduling a PUSCH transmission with the following information: {UL-TCI=2, SRI=SRS1}, based on the UL-TCI field, the UE 406 may transmit the PUSCH transmission with a TX spatial filter (e.g., TX beam) corresponding to CSI-RS2 (see Table 9 correlation). Because the SRS1 indicated by the SRI field is transmitted from UE panel 1 and/or UE resource group 1, the PUSCH transmission is transmitted by panel 1 and/or resource group 1. Following the beam of CSI-RS2, the PUSCH transmission is transmitted to the first TRP 402.

In some embodiments, if the UE 406 receives the DCI 412 (e.g., a DCI format 0_1) from the first TRP 402 scheduling a PUSCH transmission with the following information: {UL-TCI=8, SRI=SRS2}, based on the UL-TCI field, the UE 406 may transmit the PUSCH transmission using the TX spatial filter of SRS2 from UE panel 2 and/or UE resource group 2.

In various embodiments, the UE 406 may be configured with only 1 SRS resource set with usage=codebook including 2 SRS resources if ul-FullPowerTransmission is not configured or configured to fullPowerMode1. In certain embodiments, such as for the UE 406 with 2 panels, only one SRS resource may be configured for each panel. If more SRS resources may be configured in this SRS resource set in, the UE 406 may be configured with the UL-TCI states shown in Table 10.

TABLE 10

| UL-TCI-ID | UL-TCI Reference RS |
|---|---|
| UL-TCI1 | CSI-RS1 |
| UL-TCI2 | CSI-RS2 |
| UL-TCI3 | CSI-RS3 |
| UL-TCI4 | SRS1 |
| UL-TCI5 | SRS3 |
| UL-TCI6 | CSI-RS5 |
| UL-TCI7 | CSI-RS4 |
| UL-TCI8 | SRS2 |

In some embodiments, such as in separate SRS configurations, SRS1 may be configured on antenna panel 1 and/or resource group 1, and SRS2 and SRS3 may be configured on antenna panel 2 and/or resource group 2. In certain embodiments, if the UE 406 receives the DCI 412 (e.g., DCI format 0_1) from the first TRP 402 scheduling a PUSCH transmission with the following information: {UL-TCI=5, SRI=SRS2}, the UE 406 may transmit the PUSCH transmission using a TX spatial filter of SRS3 from the antenna panel 2.

In various embodiments, if the UL-TCI is an SRS resource (e.g., UL-TCI8=SRS2), the antenna panel ID and/or resource group ID of this SRS resource may be the same as the antenna panel ID and/or resource group ID of the SRS resource indicated by the SRI field.

In certain embodiments, resource group information and/or antenna panel information may be configured for a PUCCH resource group. In such embodiments, all the PUCCH resources within the group transmit from a configured resource group and/or antenna panel. In such embodiments, a triggering mechanism through RRC, MAC-CE, and/or DCI may be used. When triggered, the UE 406 transmits a PUCCH transmission from a corresponding antenna panel with an RRC configured and a MAC-CE activated TX spatial filter (e.g., via PUCCH-spatialRelation-Info). In one example, a PUCCH resource 1 may be configured as PUCCH format 0 and antenna panel ID 1. A gNB may use a MAC-CE to activate its PUCCH-spatialRelation-Info as CSI-RS2. If the UE 406 transmits PUCCH resource 1, it transmits from antenna panel ID 1 with spatial TX filter corresponding to CSI-RS2.

Figure 5:
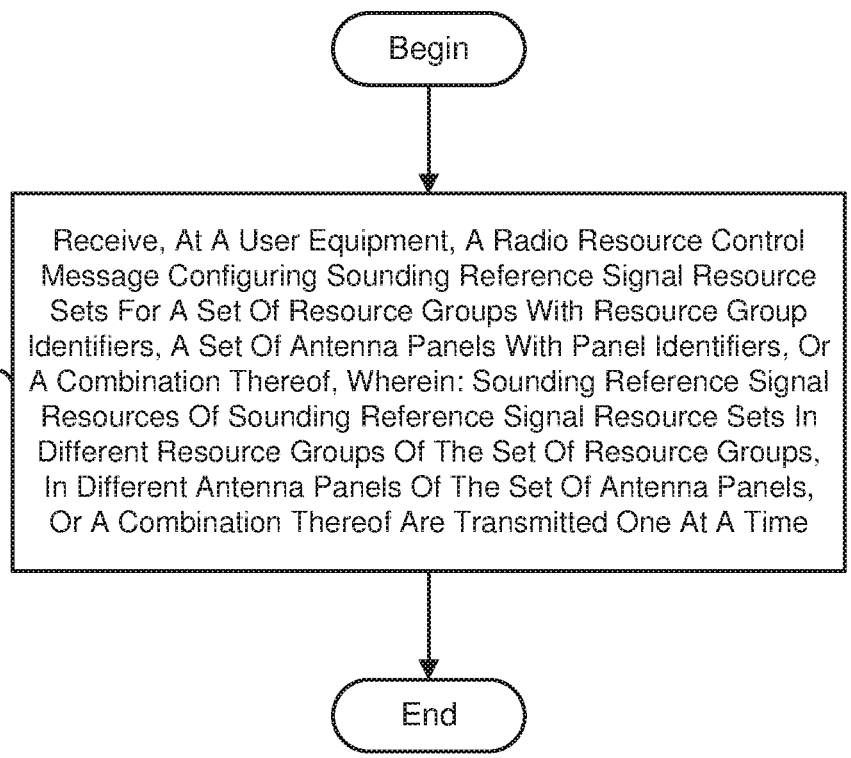
FIG. 5 is a flow chart diagram illustrating one embodiment of a method for configuring sounding reference signal resource sets.

FIG. 5 is a schematic flow chart diagram illustrating one embodiment of a method 500 for configuring sounding reference signal resource sets. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502, at a user equipment (e.g., remote unit 102), a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

In certain embodiments, the method 500 further comprises receiving downlink control information scheduling a physical uplink shared channel transmission, wherein the downlink control information comprises an uplink transmission configuration indicator field and a sounding reference signal resource indicator field, the uplink transmission configuration indicator field indicates a spatial domain transmission filter, and the sounding reference signal resource indicator field indicates panel or resource group information comprising a panel or resource group of the user equipment for the physical uplink shared channel transmission. In some embodiments, the method 500 further comprises transmitting the physical uplink shared channel transmission using the spatial domain transmission filter from the panel or resource group. In various embodiments, the method 500 further comprising deriving the panel or resource group information from the sounding reference signal resource indicator field.

In one embodiment, deriving the panel or resource group information comprises deriving the panel or resource group information from a sounding reference signal resource indicated by the sounding reference signal resource indicator field. In certain embodiments, in response to the uplink transmission configuration indicator field indicating a first sounding reference signal resource, the first sounding reference signal resource and a second sounding reference signal resource indicated by the sounding reference signal resource indicator field correspond to the same resource group of the set of resource groups, the same antenna panel of the set of antenna panels, or a combination thereof.

Figure 6:
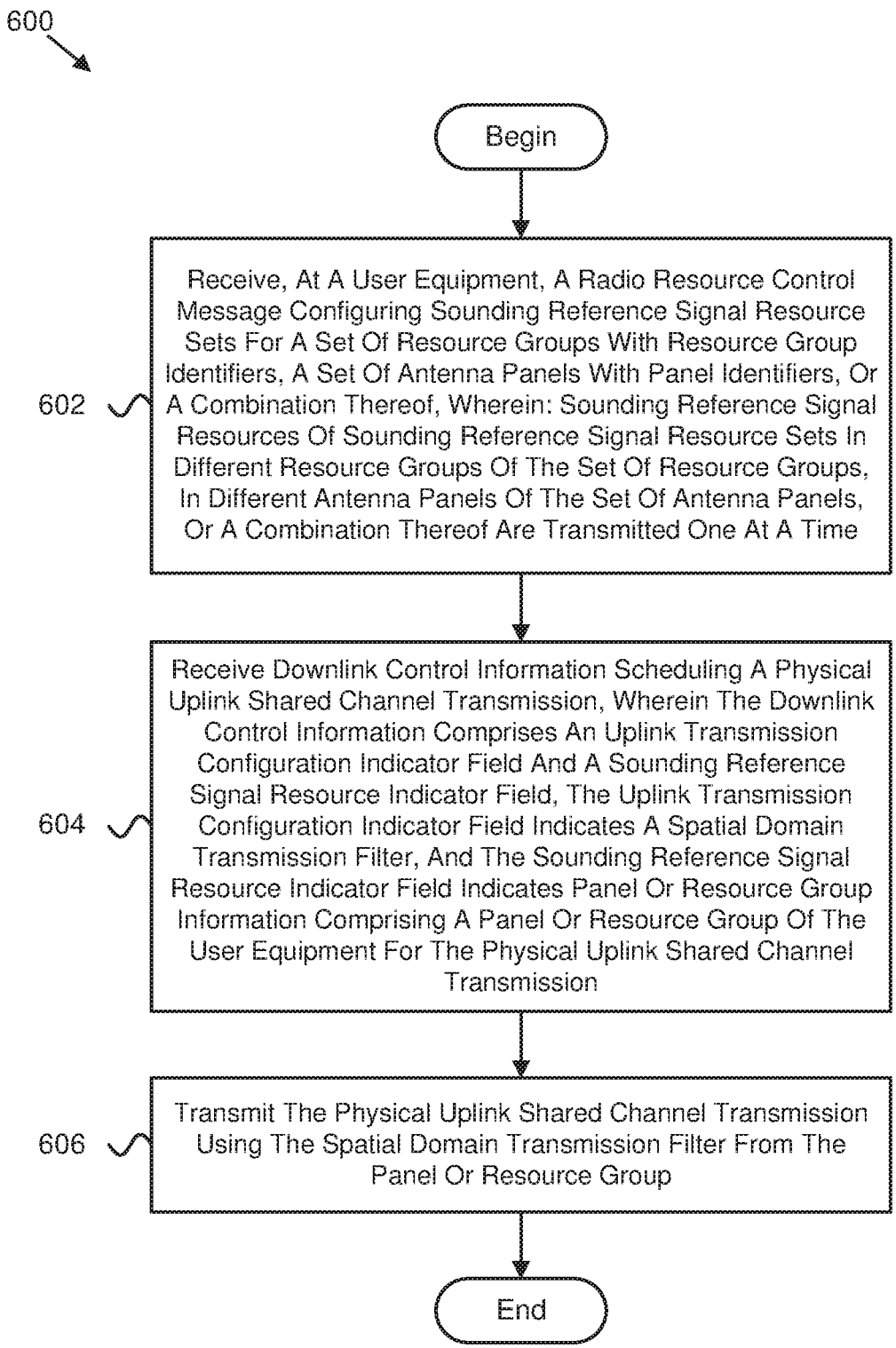
FIG. 6 is a flow chart diagram illustrating another embodiment of a method for configuring sounding reference signal resource sets.

FIG. 6 is a schematic flow chart diagram illustrating another embodiment of a method 600 for configuring sounding reference signal resource sets. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602, at a user equipment (e.g., remote unit 102), a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time. In certain embodiments, the method 600 also includes receiving 604 downlink control information scheduling a physical uplink shared channel transmission, wherein the downlink control information comprises an uplink transmission configuration indicator field and a sounding reference signal resource indicator field, the uplink transmission configuration indicator field indicates a spatial domain transmission filter, and the sounding reference signal resource indicator field indicates panel or resource group information comprising a panel or resource group of the user equipment for the physical uplink shared channel transmission. In some embodiments, the method 600 further includes transmitting 606 the physical uplink shared channel transmission using the spatial domain transmission filter from the panel or resource group.

In various embodiments, the method 600 further comprising deriving the panel or resource group information from the sounding reference signal resource indicator field. In one embodiment, deriving the panel or resource group information comprises deriving the panel or resource group information from a sounding reference signal resource indicated by the sounding reference signal resource indicator field. In certain embodiments, in response to the uplink transmission configuration indicator field indicating a first sounding reference signal resource, the first sounding reference signal resource and a second sounding reference signal resource indicated by the sounding reference signal resource indicator field correspond to the same resource group of the set of resource groups, the same antenna panel of the set of antenna panels, or a combination thereof.

Figure 7:
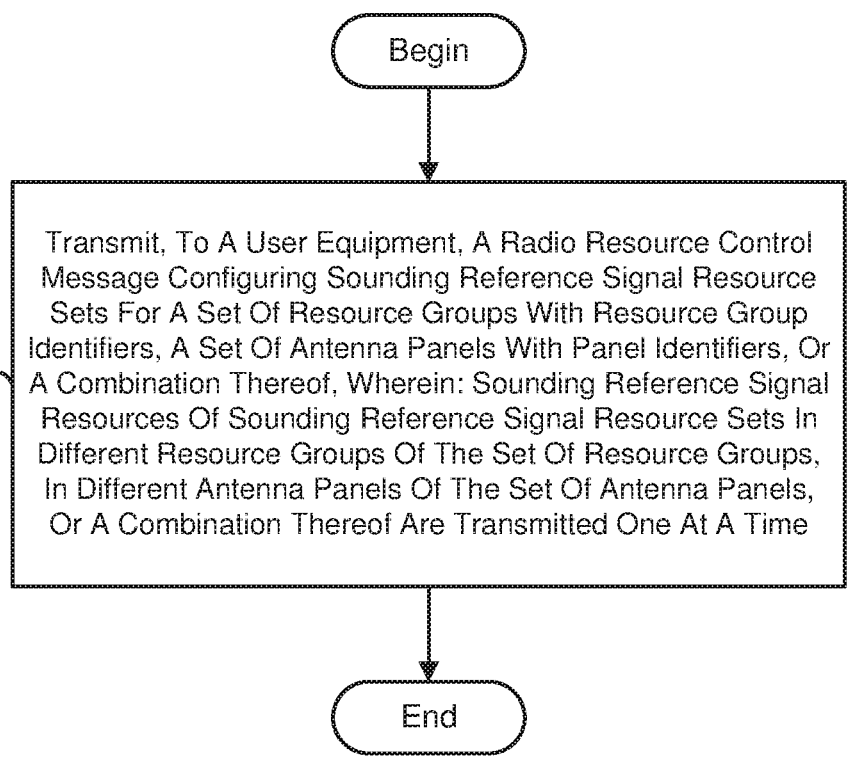
FIG. 7 is a flow chart diagram illustrating yet another embodiment of a method for configuring sounding reference signal resource sets.

FIG. 7 is a schematic flow chart diagram illustrating yet another embodiment of a method 700 for configuring sounding reference signal resource sets. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include transmitting 702, to a user equipment (e.g., remote unit 102), a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

In certain embodiments, the method 700 further comprises transmitting downlink control information scheduling a physical uplink shared channel transmission, wherein the downlink control information comprises an uplink transmission configuration indicator field and a sounding reference signal resource indicator field, the uplink transmission configuration indicator field indicates a spatial domain transmission filter, and the sounding reference signal resource indicator field indicates panel or resource group information comprising a panel or resource group of the user equipment for the physical uplink shared channel transmission. In some embodiments, the method 700 further comprises receiving the physical uplink shared channel transmission using the spatial domain transmission filter from the panel or resource group. In various embodiments, the panel or resource group information is derived from the sounding reference signal resource indicator field.

In one embodiment, the panel or resource group information is derived from a sounding reference signal resource indicated by the sounding reference signal resource indicator field. In certain embodiments, in response to the uplink transmission configuration indicator field indicating a first sounding reference signal resource, the first sounding reference signal resource and a second sounding reference signal resource indicated by the sounding reference signal resource indicator field correspond to the same resource group of the set of resource groups, the same antenna panel of the set of antenna panels, or a combination thereof.

Figure 8:
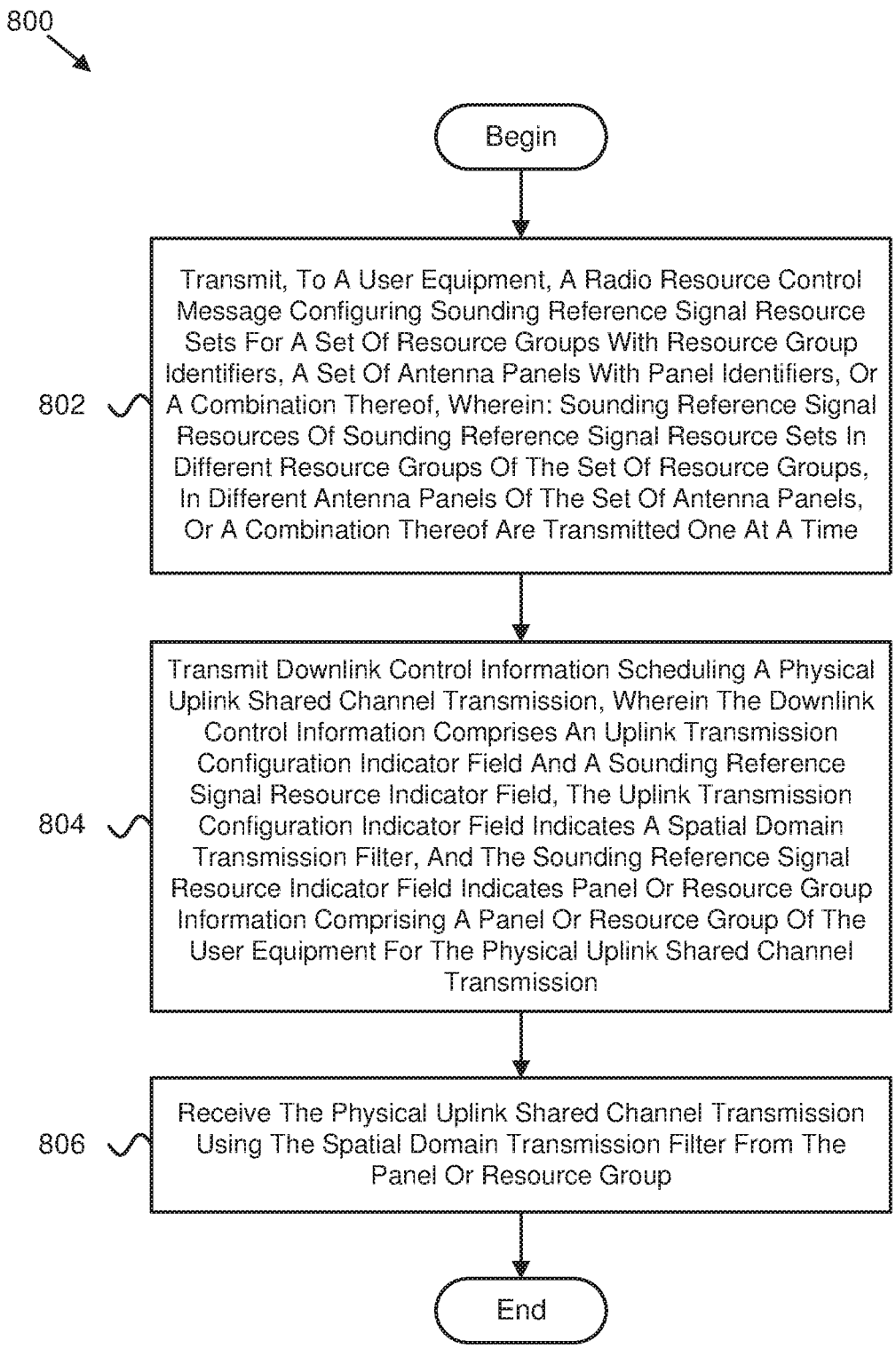
FIG. 8 is a flow chart diagram illustrating a further embodiment of a method for configuring sounding reference signal resource sets.

FIG. 8 is a schematic flow chart diagram illustrating a further embodiment of a method 800 for configuring sounding reference signal resource sets. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include transmitting 802, to a user equipment (e.g., remote unit 102), a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time. In certain embodiments, the method 800 includes transmitting 804 downlink control information scheduling a physical uplink shared channel transmission, wherein the downlink control information comprises an uplink transmission configuration indicator field and a sounding reference signal resource indicator field, the uplink transmission configuration indicator field indicates a spatial domain transmission filter, and the sounding reference signal resource indicator field indicates panel or resource group information comprising a panel or resource group of the user equipment for the physical uplink shared channel transmission. In some embodiments, the method 800 includes receiving 806 the physical uplink shared channel transmission using the spatial domain transmission filter from the panel or resource group.

In various embodiments, the panel or resource group information is derived from the sounding reference signal resource indicator field. In one embodiment, the panel or resource group information is derived from a sounding reference signal resource indicated by the sounding reference signal resource indicator field. In certain embodiments, in response to the uplink transmission configuration indicator field indicating a first sounding reference signal resource, the first sounding reference signal resource and a second sounding reference signal resource indicated by the sounding reference signal resource indicator field correspond to the same resource group of the set of resource groups, the same antenna panel of the set of antenna panels, or a combination thereof.

Figure 9:
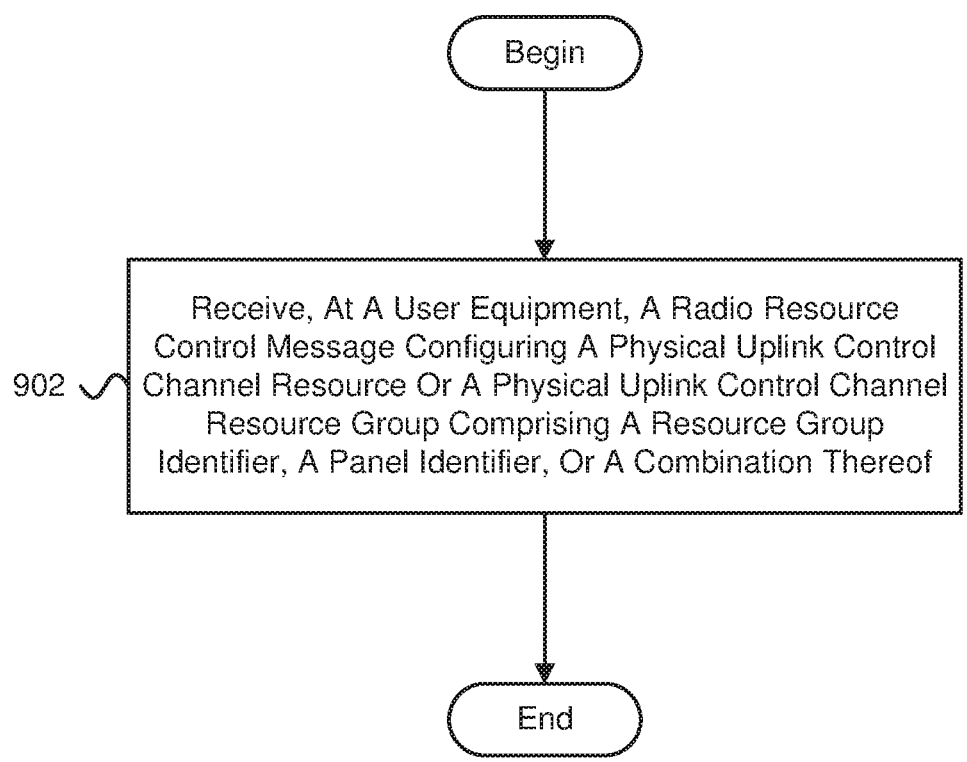
FIG. 9 is a flow chart diagram illustrating yet another embodiment of a method for configuring sounding reference signal resource sets.

FIG. 9 is a schematic flow chart diagram illustrating yet another embodiment of a method 900 for configuring sounding reference signal resource sets. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902, at a user equipment (e.g., remote unit 102), a radio resource control message configuring a physical uplink control channel resource or a physical uplink control channel resource group comprising a resource group identifier, a panel identifier, or a combination thereof.

In certain embodiments, the method 900 further comprises receiving physical uplink control channel transmission triggering information. In some embodiments, the triggering information comprises radio resource control information, a medium access control control element, downlink control information, or some combination thereof. In various embodiments, the method 900 further comprises transmitting the physical uplink control channel transmission from a resource group corresponding to the resource group identifier, a panel corresponding to the panel identifier, or the combination thereof, wherein the physical uplink control channel transmission is transmitted using a transmission spatial filter configured by radio resource control signaling and activated by the medium access control control element.

Figure 10:
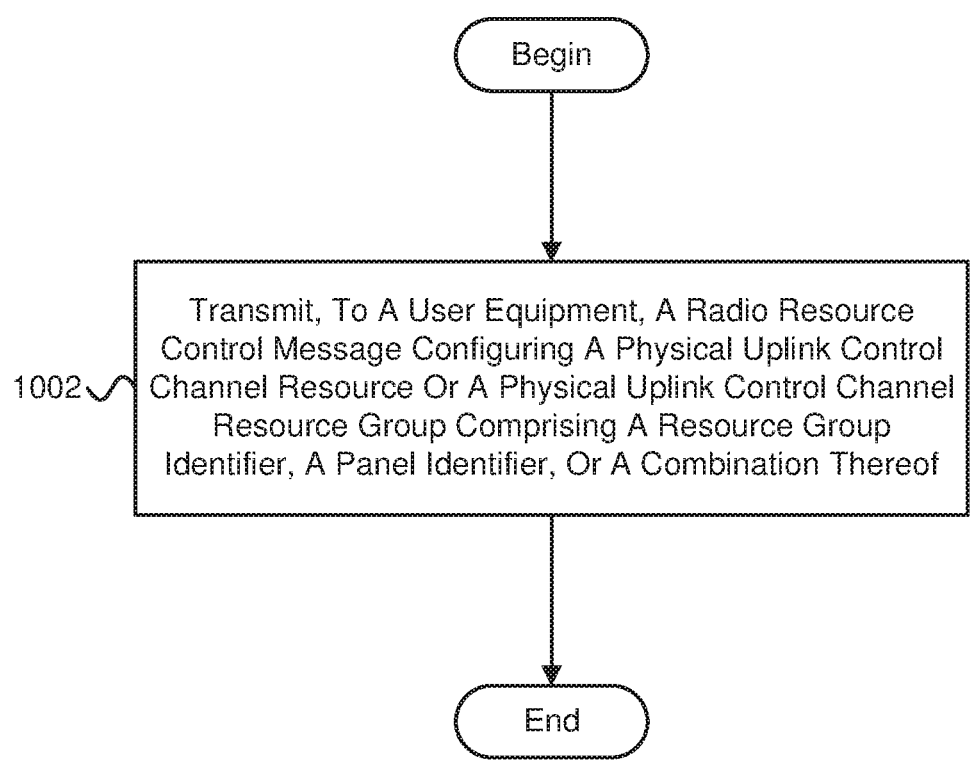
FIG. 10 is a flow chart diagram illustrating a further embodiment of a method for configuring sounding reference signal resource sets.

FIG. 10 is a schematic flow chart diagram illustrating a further embodiment of a method 1000 for configuring sounding reference signal resource sets. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002, to a user equipment (e.g., remote unit 102), a radio resource control message configuring a physical uplink control channel resource or a physical uplink control channel resource group comprising a resource group identifier, a panel identifier, or a combination thereof.

In certain embodiments, the method 1000 further comprising transmitting physical uplink control channel transmission triggering information. In some embodiments, the triggering information comprises radio resource control information, a medium access control control element, downlink control information, or some combination thereof. In various embodiments, the method 1000 further comprises receiving the physical uplink control channel transmission from a resource group corresponding to the resource group identifier, a panel corresponding to the panel identifier, or the combination thereof, wherein the physical uplink control channel transmission is transmitted using a transmission spatial filter configured by radio resource control signaling and activated by the medium access control control element.

In one embodiment, a method comprises: receiving, at a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

In certain embodiments, the method further comprises receiving downlink control information scheduling a physical uplink shared channel transmission, wherein the downlink control information comprises an uplink transmission configuration indicator field and a sounding reference signal resource indicator field, the uplink transmission configuration indicator field indicates a spatial domain transmission filter, and the sounding reference signal resource indicator field indicates panel or resource group information comprising a panel or resource group of the user equipment for the physical uplink shared channel transmission.

In some embodiments, the method further comprises transmitting the physical uplink shared channel transmission using the spatial domain transmission filter from the panel or resource group.

In various embodiments, the method further comprising deriving the panel or resource group information from the sounding reference signal resource indicator field.

In one embodiment, deriving the panel or resource group information comprises deriving the panel or resource group information from a sounding reference signal resource indicated by the sounding reference signal resource indicator field.

In certain embodiments, in response to the uplink transmission configuration indicator field indicating a first sounding reference signal resource, the first sounding reference signal resource and a second sounding reference signal resource indicated by the sounding reference signal resource indicator field correspond to the same resource group of the set of resource groups, the same antenna panel of the set of antenna panels, or a combination thereof.

In one embodiment, an apparatus comprises a user equipment, the apparatus comprises: a receiver that receives a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

In certain embodiments, the receiver receives downlink control information scheduling a physical uplink shared channel transmission, the downlink control information comprises an uplink transmission configuration indicator field and a sounding reference signal resource indicator field, the uplink transmission configuration indicator field indicates a spatial domain transmission filter, and the sounding reference signal resource indicator field indicates panel or resource group information comprising a panel or resource group of the user equipment for the physical uplink shared channel transmission.

In some embodiments, the apparatus further comprises a transmitter that transmits the physical uplink shared channel transmission using the spatial domain transmission filter from the panel or resource group.

In various embodiments, the apparatus further comprises a processor that derives the panel or resource group information from the sounding reference signal resource indicator field.

In one embodiment, deriving the panel or resource group information comprises deriving the panel or resource group information from a sounding reference signal resource indicated by the sounding reference signal resource indicator field.

In certain embodiments, in response to the uplink transmission configuration indicator field indicating a first sounding reference signal resource, the first sounding reference signal resource and a second sounding reference signal resource indicated by the sounding reference signal resource indicator field correspond to the same resource group of the set of resource groups, the same antenna panel of the set of antenna panels, or a combination thereof.

In one embodiment, a method comprises: transmitting, to a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

In certain embodiments, the method further comprises transmitting downlink control information scheduling a physical uplink shared channel transmission, wherein the downlink control information comprises an uplink transmission configuration indicator field and a sounding reference signal resource indicator field, the uplink transmission configuration indicator field indicates a spatial domain transmission filter, and the sounding reference signal resource indicator field indicates panel or resource group information comprising a panel or resource group of the user equipment for the physical uplink shared channel transmission.

In some embodiments, the method further comprises receiving the physical uplink shared channel transmission using the spatial domain transmission filter from the panel or resource group.

In various embodiments, the panel or resource group information is derived from the sounding reference signal resource indicator field.

In one embodiment, the panel or resource group information is derived from a sounding reference signal resource indicated by the sounding reference signal resource indicator field.

In certain embodiments, in response to the uplink transmission configuration indicator field indicating a first sounding reference signal resource, the first sounding reference signal resource and a second sounding reference signal resource indicated by the sounding reference signal resource indicator field correspond to the same resource group of the set of resource groups, the same antenna panel of the set of antenna panels, or a combination thereof.

In one embodiment, an apparatus comprises: a transmitter that transmits, to a user equipment, a radio resource control message configuring sounding reference signal resource sets for a set of resource groups with resource group identifiers, a set of antenna panels with panel identifiers, or a combination thereof, wherein: sounding reference signal resources of sounding reference signal resource sets in different resource groups of the set of resource groups, in different antenna panels of the set of antenna panels, or a combination thereof are transmitted one at a time.

In certain embodiments, the transmitter transmits downlink control information scheduling a physical uplink shared channel transmission, wherein the downlink control information comprises an uplink transmission configuration indicator field and a sounding reference signal resource indicator field, the uplink transmission configuration indicator field indicates a spatial domain transmission filter, and the sounding reference signal resource indicator field indicates panel or resource group information comprising a or resource group panel of the user equipment for the physical uplink shared channel transmission.

In some embodiments, the apparatus further comprises a receiver that receives the physical uplink shared channel transmission using the spatial domain transmission filter from the panel or resource group.

In various embodiments, the panel or resource group information is derived from the sounding reference signal resource indicator field.

In one embodiment, the panel or resource group information is derived from a sounding reference signal resource indicated by the sounding reference signal resource indicator field.

In certain embodiments, in response to the uplink transmission configuration indicator field indicating a first sounding reference signal resource, the first sounding reference signal resource and a second sounding reference signal resource indicated by the sounding reference signal resource indicator field correspond to the same resource group of the set of resource groups, the same antenna panel of the set of antenna panels, or a combination thereof.

In one embodiment, a method comprises: receiving, at a user equipment, a radio resource control message configuring a physical uplink control channel resource or a physical uplink control channel resource group comprising a resource group identifier, a panel identifier, or a combination thereof.

In certain embodiments, the method further comprises receiving physical uplink control channel transmission triggering information.

In some embodiments, the triggering information comprises radio resource control information, a medium access control control element, downlink control information, or some combination thereof.

In various embodiments, the method further comprises transmitting the physical uplink control channel transmission from a resource group corresponding to the resource group identifier, a panel corresponding to the panel identifier, or the combination thereof, wherein the physical uplink control channel transmission is transmitted using a transmission spatial filter configured by radio resource control signaling and activated by the medium access control control element.

In one embodiment, an apparatus comprises a user equipment, the apparatus comprises: a receiver that receives a radio resource control message configuring a physical uplink control channel resource or a physical uplink control channel resource group comprising a resource group identifier, a panel identifier, or a combination thereof.

In certain embodiments, the receiver receives physical uplink control channel transmission triggering information.

In some embodiments, the triggering information comprises radio resource control information, a medium access control control element, downlink control information, or some combination thereof.

In various embodiments, the apparatus further comprises a transmitter that transmits the physical uplink control channel transmission from a resource group corresponding to the resource group identifier, a panel corresponding to the panel identifier, or the combination thereof, wherein the physical uplink control channel transmission is transmitted using a transmission spatial filter configured by radio resource control signaling and activated by the medium access control control element.

In one embodiment, a method comprises: transmitting, to a user equipment, a radio resource control message configuring a physical uplink control channel resource or a physical uplink control channel resource group comprising a resource group identifier, a panel identifier, or a combination thereof.

In certain embodiments, the method further comprising transmitting physical uplink control channel transmission triggering information.

In some embodiments, the triggering information comprises radio resource control information, a medium access control control element, downlink control information, or some combination thereof.

In various embodiments, the method further comprises receiving the physical uplink control channel transmission from a resource group corresponding to the resource group identifier, a panel corresponding to the panel identifier, or the combination thereof, wherein the physical uplink control channel transmission is transmitted using a transmission spatial filter configured by radio resource control signaling and activated by the medium access control control element.

In one embodiment, an apparatus comprises: a transmitter that transmits, to a user equipment, a radio resource control message configuring a physical uplink control channel resource or a physical uplink control channel resource group comprising a resource group identifier, a panel identifier, or a combination thereof.

In certain embodiments, the transmitter transmits physical uplink control channel transmission triggering information.

In some embodiments, the triggering information comprises radio resource control information, a medium access control control element, downlink control information, or some combination thereof.

In various embodiments, the apparatus further comprises a receiver that receives the physical uplink control channel transmission from a resource group corresponding to the resource group identifier, a panel corresponding to the panel identifier, or the combination thereof, wherein the physical uplink control channel transmission is transmitted using a transmission spatial filter configured by radio resource control signaling and activated by the medium access control control element.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
   at least one memory; and
   at least one processor coupled with the at least one memory and configured to cause the UE to:
      receive a radio resource control (RRC) message configuring sounding reference signal (SRS) resource sets for a set of resource groups with resource group identifiers, or a set of antenna panels with panel identifiers, or both, wherein:
         SRS resources of the SRS resource sets in different resource groups of the set of resource groups, or in different antenna panels of the set of antenna panels, or both are transmitted one at a time; and
      receive downlink control information (DCI) scheduling a physical uplink shared channel (PUSCH) transmission, wherein the DCI comprises an uplink transmission configuration indicator (TCI) field and a SRS resource indicator (RI) field, the uplink TCI field indicates a spatial domain transmission filter, and the SRS RI field indicates panel or resource group information comprising a panel or resource group of the UE for the PUSCH transmission, wherein, in response to the uplink TCI field indicating a first SRS resource, the first SRS resource and a second SRS resource indicated by the SRS RI field correspond to the same resource group of the set of resource groups, or the same antenna panel of the set of antenna panels, or both.

2. The UE of claim 1, wherein the at least one processor is configured to cause the UE to transmit the PUSCH transmission using the spatial domain transmission filter from the panel or resource group.

3. The UE of claim 1, wherein the at least one processor is configured to cause the UE to derive the panel or resource group information from the SRS RI field.

4. The UE of claim 3, wherein deriving the panel or resource group information comprises deriving the panel or resource group information from a SRS resource indicated by the SRS RI field.

5. A base station, comprising:
   at least one memory; and
   at least one processor coupled with the at least one memory and configured to cause the base station to:
      transmit, to a user equipment (UE), a radio resource control (RRC) message configuring sounding reference signal (SRS) resource sets for a set of resource groups with resource group identifiers, or a set of antenna panels with panel identifiers, or both, wherein:
         SRS resources of the SRS resource sets in different resource groups of the set of resource groups, or in different antenna panels of the set of antenna panels, or both are transmitted one at a time; and
      transmit downlink control information (DCI) scheduling a physical uplink shared channel (PUSCH) transmission, wherein the DCI comprises an uplink transmission configuration indicator (TCI) field and a SRS resource indicator (RI) field, the uplink TCI field indicates a spatial domain transmission filter, and the SRS RI field indicates panel or resource group information comprising a panel or resource group of the UE for the PUSCH transmission, wherein, in response to the uplink TCI field indicating a first SRS resource, the first SRS resource and a second SRS resource indicated by the SRS RI field correspond to the same resource group of the set of resource groups, or the same antenna panel of the set of antenna panels, or both.

6. The base station of claim 5, wherein the at least one processor is configured to cause the base station to receive the PUSCH transmission using the spatial domain transmission filter from the panel or resource group.

7. The base station of claim 5, wherein the panel or resource group information is derived from the SRS RI field.

8. The base station of claim 5, wherein the panel or resource group information is derived from a SRS resource indicated by the SRS RI field.

9. A user equipment (UE), comprising:
   at least one memory; and
   at least one processor coupled with the at least one memory and configured to cause the UE to:
      receive a radio resource control (RRC) message configuring a physical uplink control channel (PUCCH) resource or a PUCCH resource group, wherein either the PUCCH resource or the PUCCH resource group comprises a resource group identifier, or a panel identifier, or both; and
      receive downlink control information (DCI) scheduling a physical uplink shared channel (PUSCH) transmission, wherein the DCI comprises an uplink transmission configuration indicator (TCI) field and a sounding reference signal (SRS) resource indicator (RI) field, the uplink TCI field indicates a spatial domain transmission filter, and the SRS RI field indicates panel or resource group information comprising a panel or resource group of the UE for the PUSCH transmission, wherein, in response to the uplink TCI field indicating a first SRS resource, the first SRS resource and a second SRS resource indicated by the SRS RI field correspond to the same resource group of a set of resource groups, or the same antenna panel of a set of antenna panels, or both.

10. The UE of claim 9, wherein the at least one processor is configured to cause the UE to receive PUCCH transmission triggering information.

11. The UE of claim 10, wherein the PUSCH transmission triggering information comprises one or more of radio resource control (RRC) information, a medium access control control element (MAC CE), or DCI.

12. The UE of claim 11, wherein the at least one processor is configured to cause the UE to transmit the PUCCH transmission from a resource group corresponding to the resource group identifier, or a panel corresponding to the panel identifier, or both, wherein the PUCCH transmission is transmitted using a transmission spatial filter configured by RRC signaling and activated by the MAC CE.

* * * * *